(No Model.)
E. H. TURNER.
NURSING BOTTLE.
No. 514,575. Patented Feb. 13, 1894.
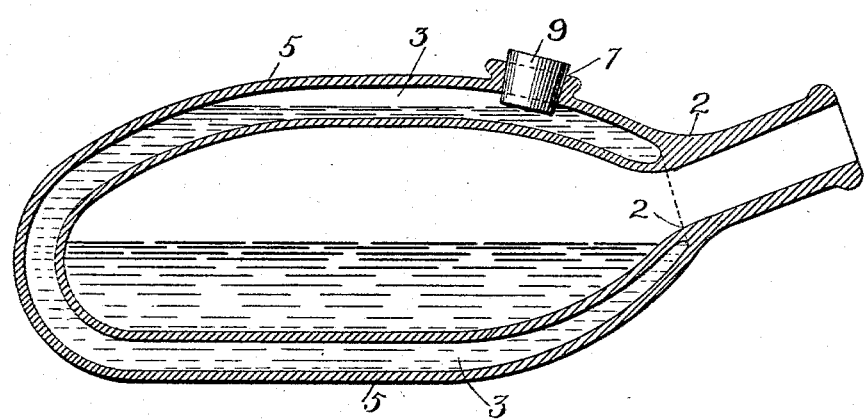
Witnesses
J. E. Purple
F. S. Lyon
Inventor
Edward H. Turner
By Paul & Hawley Atty's

UNITED STATES PATENT OFFICE.

EDWARD H. TURNER, OF MINNEAPOLIS, MINNESOTA.

NURSING-BOTTLE.

SPECIFICATION forming part of Letters Patent No. 514,575, dated February 13, 1894.

Application filed May 23, 1893. Serial No. 475,211. (No model.)

*To all whom it may concern:*

Be it known that I, EDWARD H. TURNER, of the city of Minneapolis, county of Hennepin, State of Minnesota, have invented certain new and useful Improvements in Nursing-Bottles, of which the following is a specification.

This invention relates to improvements in nursing bottles, in which the milk or food may be placed and may be warmed or heated by warm or hot water placed in the chamber surrounding the main part of the bottle and formed integrally therewith.

The invention will be more readily understood by reference to the accompanying drawing, which shows a longitudinal section of a nursing bottle constructed in accordance with my invention.

In the drawing, 2 represents the main part of the bottle which may be of any suitable form and construction and is preferably formed of glass in the usual way. Surrounding the main part of the bottle and preferably constructed integrally therewith is a chamber 3, formed by the outer wall 5 which is preferably joined to the main part of the bottle at the neck portion thereof and may also be joined at other points if desired. The chamber 3 is provided with a suitable filling orifice 7, having the stopper or other suitable closing device 9. When it is desired to use the bottle the milk or food is placed in the bottle proper and may be put in without being heated, and the chamber 3 is then filled with heated water which is put in through the orifice 7. This water serves to heat up the milk or food in the bottle proper and will hold it in this warm condition for a long time.

Instead of having to heat the food at intervals or whenever it is desired to use the bottle, the chamber 3 may be filled with the hot water, the milk or food may be put into the bottle at any time and it will then become warm and will remain in this condition until used.

Having thus described my invention, I claim as new and desire to secure by Letters Patent—

1. As an article of manufacture, the herein described nursing bottle, provided with the surrounding chamber 3, inclosed by the wall 5 formed integrally with the bottle and provided with a suitable filling orifice 7, substantially as described.

2. As an article of manufacture, the herein described nursing bottle, provided with the chamber 3 surrounding the body of the bottle and provided with a suitable filling orifice 7, substantially as described.

In testimony whereof I have hereunto set my hand this 20th day of May, 1893.

EDWARD H. TURNER.

In presence of—
F. S. LYON,
A. C. PAUL.